United States Patent [19]

Chan

[11] Patent Number: 5,800,737
[45] Date of Patent: Sep. 1, 1998

[54] LIQUID CRYSTAL COMPOSITIONS

[75] Inventor: Lawrence Kam Ming Chan, Northolt, England

[73] Assignee: Central Research Laboratories Limited, Hayes, England

[21] Appl. No.: 750,119

[22] PCT Filed: May 30, 1995

[86] PCT No.: PCT/GB95/01240

§ 371 Date: Feb. 25, 1997

§ 102(e) Date: Feb. 25, 1997

[87] PCT Pub. No.: WO95/33802

PCT Pub. Date: Dec. 14, 1995

[30] Foreign Application Priority Data

Jun. 4, 1994 [GB] United Kingdom ............... 9411233

[51] Int. Cl.$^6$ ............... C09K 19/12; C09K 19/34
[52] U.S. Cl. ............... 252/299.66; 252/299.61
[58] Field of Search ............... 252/299.66, 299.61

[56] References Cited

U.S. PATENT DOCUMENTS

| | | | |
|---|---|---|---|
| 5,182,047 | 1/1993 | Coates et al. | 252/299.66 |
| 5,273,680 | 12/1993 | Gray et al. | 252/299.66 |
| 5,316,694 | 5/1994 | Murashiro et al. | 252/299.61 |
| 5,378,392 | 1/1995 | Murashiro et al. | 252/299.01 |
| 5,384,071 | 1/1995 | Gray et al. | 252/299.63 |
| 5,486,309 | 1/1996 | Gray et al. | 252/299.6 |

*Primary Examiner*—C. H. Kelly
*Attorney, Agent, or Firm*—Evenson, McKeown, Edwards & Lenahan, PLLC

[57] ABSTRACT

A liquid crystal composition comprising from 90% to 99.9% by weight of one or more achiral host compounds of the formula 1

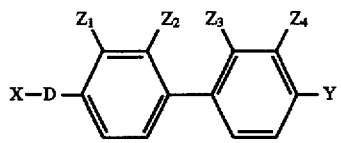

FORMULA 1 wherein
X is $A_1$ or $OA_1$;
Y is $A_1$, $OA_1$; $OCOA_1$ or $CO_2A_1$;
$A_1$ is a straight or branched chain alkyl group containing from 1 to 18 carbon atoms, optionally substituted with one or more F or CN;
$Z_1$, $Z_2$, $Z_3$, and $Z_4$ may each be H or F, but either one or two of $Z_1$, $Z_2$, $Z_3$, and $Z_4$ must be F;
D is

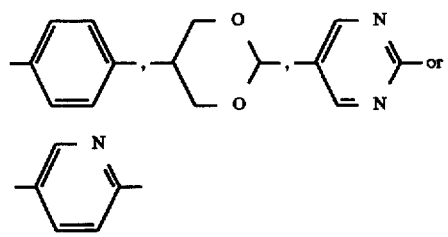

and from 0.1% to 10% by weight of a chiral dopant compound of the formula 2:

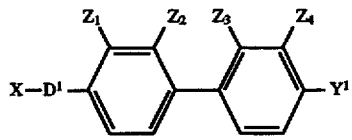

FORMULA 2 wherein the substituents are described herein.

14 Claims, No Drawings

LIQUID CRYSTAL COMPOSITIONS

This application is a 371 of PCT/GB95/01240 filed May 30, 1996 now abandoned.

This invention relates to liquid crystal compositions and to devices incorporating such compositions. Such compositions are incorporated in liquid crystal devices (LCDs) and exhibit useful electro-optical effects, due to the fact that by application of an electric field across a thin layer of such a composition the molecules can be caused to switch between two possible states of molecular orientation and, as a result of the anisotropy of such a medium, the optical properties of the two states are different and the transmission and/or reflection of light is changed. One particular class of compositions in which both of the states are stable even in the absence of an applied field contains such a thin layer and exhibits ferro-electricity. It is with such compositions that the present invention is concerned.

It is desirable in such ferro-electric compositions to achieve a high contrast ratio and high transmissivity over as wide a temperature range as possible whilst utilising the lowest possible operating voltage. To achieve this, it is believed that the molecules comprising the composition should be in as ordered a state as possible, a property which is often measured by the so-called "relaxed cone angle" which should ideally be 45°. Some success in this regard has been obtained previously by modifying the environment containing the composition, which typically comprises two parallel flat glass plates, for example by providing the so called "high surface tilt alignment layer" on the surfaces of the plates which come into contact with the composition. However, this is very difficult to apply sufficiently uniformly and consistently, which leads to low yields of product and corresponding high costs.

It is an object of the present invention to provide a ferro-electric liquid crystal composition which, in the absence of such expensive alignment layers, exhibits a high cone angle.

Accordingly we provide a composition comprising from 90% to 99.9% by weight of one or more achiral host compounds of the formula 1;

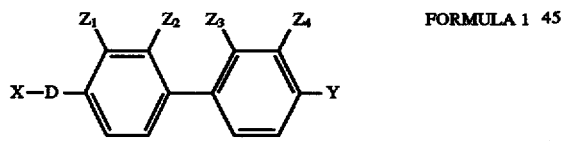

FORMULA 1 wherein

X is $A_1$ or $OA_1$;

Y is $A_1$, $OA_1$, $OCOA_1$ or $CO_2A_1$;

$A_1$ is a straight or branched chain alkyl group containing from 1 to 18 carbon atoms, optionally substituted with one or more F or CN;

$Z_1$, $Z_2$, $Z_3$, and $Z4$ may each be H or F, but either one or two of $Z_1$, $Z_2$, $Z_3$, and $Z_4$ must be F;

D is

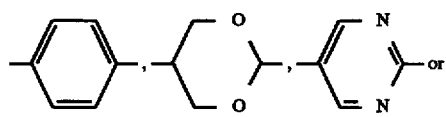

-continued

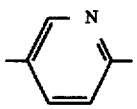

and from 0.1% to 10% by weight of a chiral dopant compound of the formula 2:

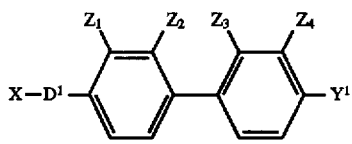

FORMULA 2 wherein $D^1$ is D (as in Formula 1) or a single bond;

$Y^1$ is $OA_3$, $OCOA_3$ or $CO_2A_4$;

$A_3$ is an alkyl group containing from 1 to 18 carbon atoms, optionally substituted with one or more F or CN and containing at least one centre of asymmetry;

$A_4$ can either be the same as $A_3$ or a group of the formula —CH($R_1$)COA$_5$ wherein $R_1$ is an alkyl group containing from 1 to 5 carbon atoms and $A_5$ is $OR_1$ or —N($R_2$)$R_3$ where $R_2$ and $R_3$ are hydrogen, $R_1$, phenyl optionally substituted by $R_1$, or together form a homocyclic or heterocyclic ring optionally substituted by $R_1$, provided that $R_2$ and $R_3$ are not the same; and D, X, $Z_1$, $Z_2$, $Z_3$ and $Z_4$ have the above significance, except that all of $Z_1$, $Z_2$, $Z_3$ and $Z_4$ can be hydrogen.

By achiral compounds we mean compounds which are not optically active either because they possess no centre of asymmetry or because they contain a racemic mixture of the (+) and (−) forms of such enantiomers.

By chiral compounds we mean compounds which are optical active because they possess a centre of asymmetry.

Particularly useful achiral host compounds of formula 1 comprise those in which:

$A_1$ is a straight chain alkyl containing from 3 to 12 carbon atoms;

D is

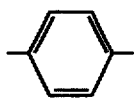

either $Z_1$ is F and $Z_2$, $Z_3$, $Z_4$, are H or $Z_1$, $Z_2$, are H and $Z_3$, $Z_4$ are F;

Y is $A_1$ or $OA_1$

Particularly useful chiral dopant compounds of formula 2 comprise those in which:

$D^1$ is

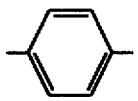

or a single bond;

$A_1$ is a straight chain alkyl containing from 3 to 12 carbon atoms;

either $Z_1$ is F and $Z_2$, $Z_3$, $Z_4$ are H or $Z_1$, $Z_2$, are H and $Z_3$, $Z_4$ are F, or all of $Z_1$, $Z_2$, $Z_3$ and $Z_4$ are H;

$Y^1$ is $CO_2A_4$;

$A_4$ is a straight or branched chain alkyl group substituted by F or CN or a branched chain alkyl group possessing a centre of asymmetry or
—CH($R_1$)—CON($R_2$)$R_3$
Specific achiral host compounds of formula 1 which we have found to be particularly useful include:
COMPOUND A1 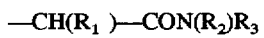
COMPOUND A2 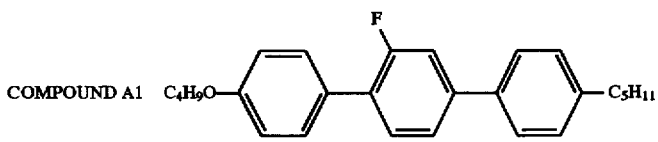
COMPOUND A3 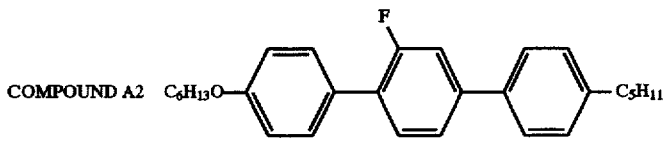
COMPOUND A4 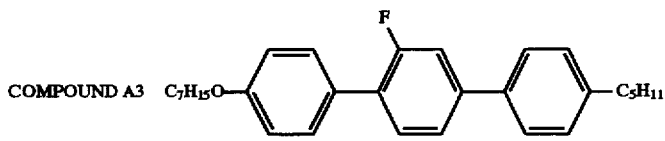
COMPOUND A5 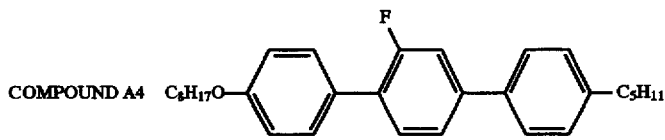
COMPOUND B 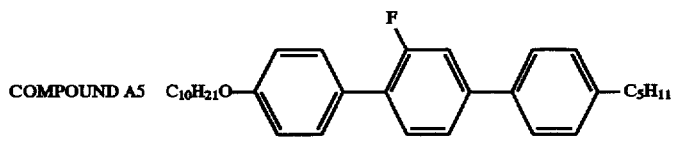
COMPOUND C1 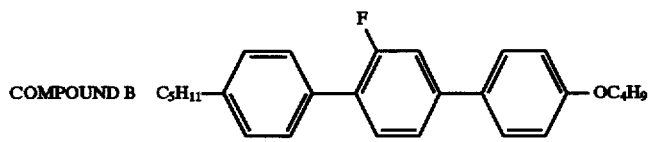
COMPOUND C2 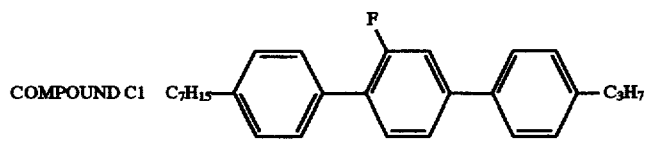
COMPOUND C3 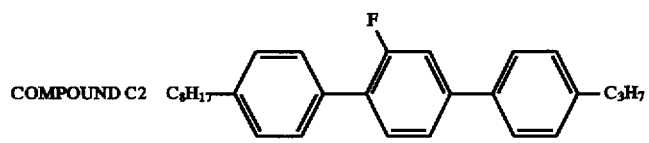
COMPOUND C4 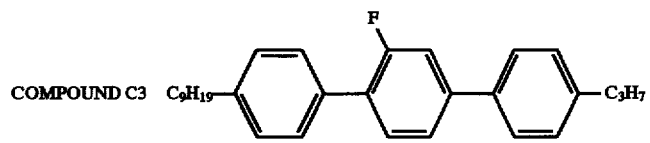

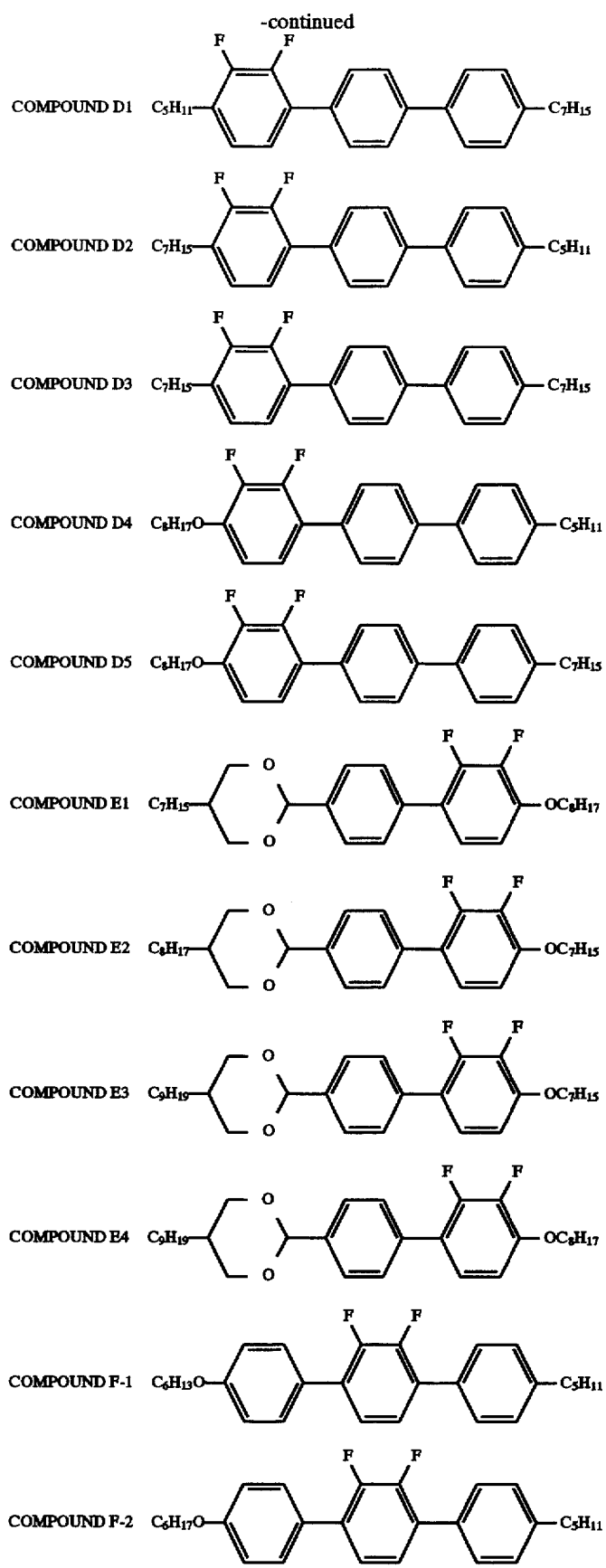

-continued
COMPOUND F-3 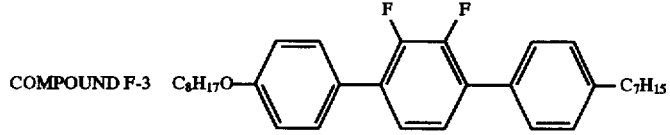
Specific chiral dopant compounds which we have found to be particularly useful include:
COMPOUND X1 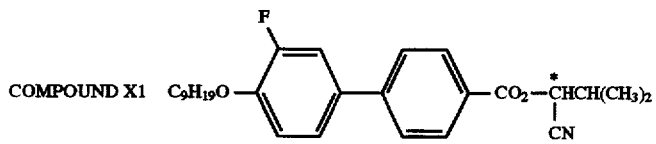
COMPOUND Y1 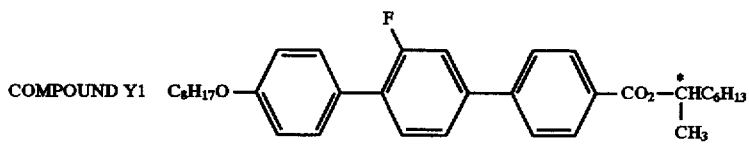
COMPOUND Y2 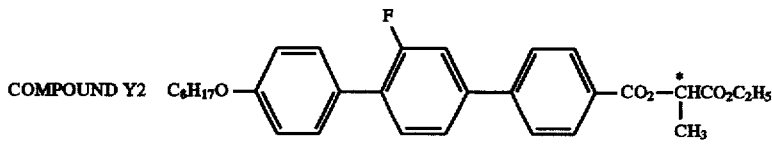
COMPOUND Y3 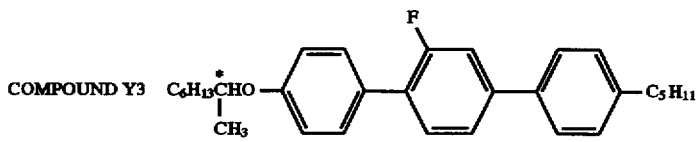
COMPOUND Z1 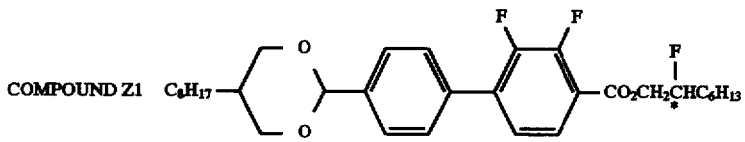
COMPOUND Z2 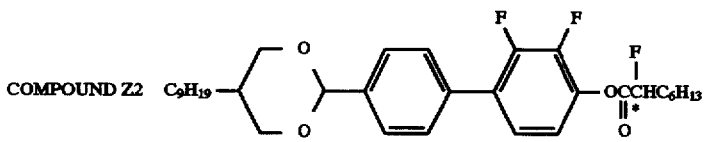
COMPOUND N1 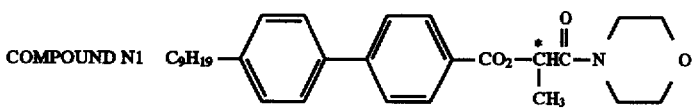
COMPOUND N2 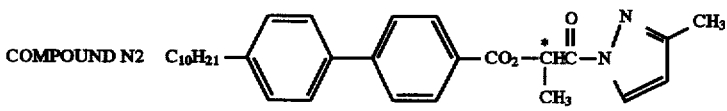
COMPOUND N3 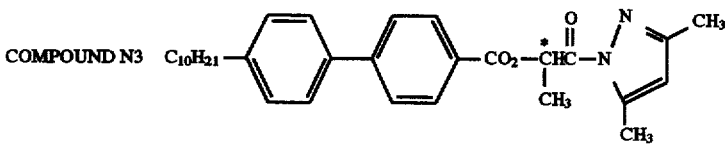
COMPOUND N4 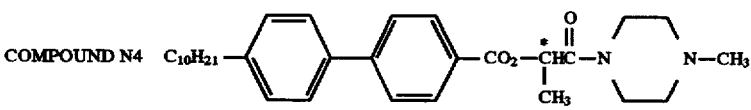

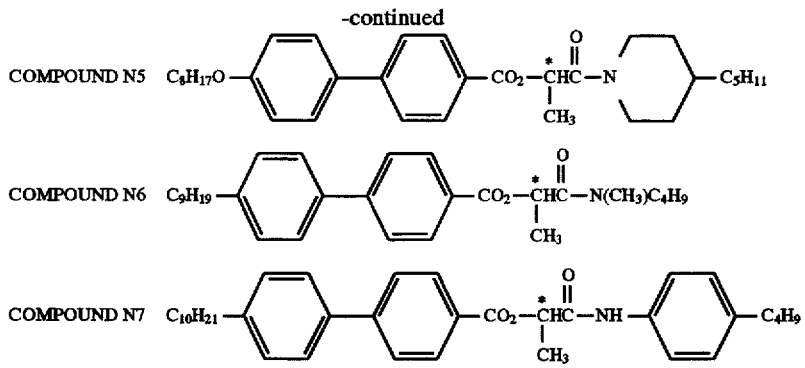

The compounds used as achiral hosts and as chiral dopants are known and most are commercially available.

The achiral host is formulated as a mixture of at least four compounds of formula 1 such that this mixture has suitable physical properties i.e. such that it remains in the liquid crystalline state between −25° C. and 100° C.

The compositions of our invention comprise the said mixture of achiral host compounds of formula 1 and at least one dopant of formula 2, and when mixed to form an eutectic ferro-electric liquid crystal mixture, exhibit a high degree of ordering of their molecules, which is believed to be due to the composition being in the so-called chiral Smectic I phase (denoted as $S^*_I$ phase. Although the $S^*_I$ phase range exhibited by most of the ferro-electric liquid crystal (FLC) mixtures are found to be in the range of 20° C. to 40° C., the higher ordered FLC phases such as $S^*_J$ and $S^*_K$ which occur at temperatures below the $S^*_I$ phase do not affect the alignment stability macroscopically. This is also true for the lower ordered FLC $S^*_C$ phase which occurs at a higher temperature above the $S^*_I$. Hence, an FLC device containing such mixtures can be stored over a wide temperature of >−25° C. up to 90° C.

The relaxed cone angle (θ) of a ferro-electric liquid crystal device (FLCD) is measured in the absence of an applied field. It is normally carried out under crossed polarising microscope. A region in the FLCD cell containing the two domain states that are adjacent to each other (ie, the dark and bright states) is then selected and the cell is rotated until an extinction for one of the states is obtained. The position on the rotating stage of the microscope is noted as $\theta_1$. The cell is then rotated in either clockwise or anticlockwise direction until an extinction for the other domain states has occurred and the new position on the stage is noted as $\theta_2$. The relaxed cone angle, θ, of the FLCD is taken as the difference of $\theta_2 - \theta_1$. The measurement is valid only when θ is ≦45° C.

As will be seen from the specific examples given hereafter, the compositions of our invention exhibit a relaxed cone angle of greater than 20° over a range of 5° C. to 30° C. and, when it is believed that the $S^*_I$ phase is present, a cone angle of greater than 25° over a range of 5° C. to 45° C. and, at the most common ambient working temperatures of 5° C. to 40° C., a cone angle of greater than 28°.

The consequence of this high cone angle is that the liquid crystal cells incorporating our compositions have a high contrast ratio of at least 10:1 over the temperature range (−25° C. to 60° C.) and of at least 50:1 within the usual working range of 5° C. to 40° C.

Devices made which contain cells employing our compositions (in the $S^*_I$ phase) also exhibit a high light transmission (between 15% to 20% or about twice as high as the FLCD using the $S^*_C$ phase) and are more mechanically stable than devices employing previously known compositions containing the $S^*_C$ phase.

The invention is illustrated, but in no way limited, by the following examples.

EXAMPLES 1 to 5

Mixtures were prepared containing the percentages by weight as shown in Table I of the achiral compounds A to F and of the chiral dopant X1. In the case of Examples 1 to 4 racemic XI (i.e. a mixture of the S–(+) and S–(−) enantiomers of XI) was also present.

Table II shows the properties of the resultant mixtures including the range of temperatures over which these exhibit $S^*_I$ and the $S^*_C$ phases; the relaxed cone angle as measured over a temperature range from 5° C. to 40° C.; and the contrast ratio over the same temperature range.

Additionally it may be noted that the relaxed cone angle of the mixture of Example 1 was between 28° and 32° over the temperature range 20° to 35° C. and 30° at 25° C. Even at 45° C. ($S^*_C$ phase) the relaxed cone angle was still 15°. For the same mixture at temperatures above 45° C., the contrast ratio was still between 10:1 and 30:1.

EXAMPLES 6 to 17

Mixtures comprising the same blend of host compounds as in Example 5 but, in the place of the dopant X2 using 2.0 per cent by weight of the dopants indicated in Table II yielded mixtures having the properties indicated in table II.

TABLE I

| | % wt composition of mixtures | | | | |
|---|---|---|---|---|---|
| COMPOUND | EXAMPLE 1 | EXAMPLE 2 | EXAMPLE 3 | EXAMPLE 4 | EXAMPLE 5 |
| C1 | | 12.5 | 12.0 | 11.4 | 7.5 |
| C2 | 12.7 | | | | |
| C3 | | 12.5 | 12.0 | 11.4 | 7.5 |
| C4 | 12.7 | | | | |
| A1 | 25.3 | 6.7 | 6.5 | 6.1 | 8.9 |

TABLE I-continued

% wt composition of mixtures

| COMPOUND | EXAMPLE 1 | EXAMPLE 2 | EXAMPLE 3 | EXAMPLE 4 | EXAMPLE 5 |
|---|---|---|---|---|---|
| A2 | 20.3 | 15.7 | 15.1 | 14.3 | 20.9 |
| A3 |  | 15.7 | 15.1 | 14.3 | 20.9 |
| A4 | 5.0 | 5.0 | 4.8 | 4.5 |  |
| A5 |  | 6.7 | 6.5 | 6.1 | 8.9 |
| D1 | 12.0 | 16.0 | 15.4 | 14.6 | 14.5 |
| D2 | 4.0 | 2.0 | 1.9 | 1.8 | 2.2 |
| D3 | 4.0 | 2.0 | 1.9 | 1.8 | 1.9 |
| D4 |  |  |  | 1.2 | 2.4 |
| D5 |  |  |  | 1.2 | 2.4 |
| F1 |  |  | 1.0 | 1.9 |  |
| F2 |  |  | 1.0 | 1.9 |  |
| F3 |  |  | 0.5 | 1.0 |  |
| E1 |  |  |  |  | 1.2 |
| E2 |  |  |  |  | 1.2 |
| E3 |  |  |  |  | 1.2 |
| E4 |  |  |  |  | 1.2 |
| X1 CHIRAL | 2.0 | 2.0 | 2.0 | 2.0 | 2.0 |
| X1 RACEMIC | 2.0 | 3.0 | 2.0 | 2.0 |  |
| TOTAL | 100.0 | 100.0 | 100.0 | 100.0 | 100.0 |

TABLE II

| Mixture example | Dopant | $S_I^*$ range °C. | SC* range °C. | Relaxed cone angle 40 to 5° C. | Contrast ratio 40 to 5° C. |
|---|---|---|---|---|---|
| 1 | X1 | <20–42 | 42–86 | 25–38 | 50:1 to >100:1 |
| 2 | X1 | <10–39 | 39–79 | 16–30 | 20:1 to >100:1 |
| 3 | X1 | <10–38 | 38–87 | 13–34 | 20:1 to >100:1 |
| 4 | X1 | <10–32 | 32–90 | 13–35 | 10:1 to >100:1 |
| 5 | X1 | <20–40 | 40–95 | 20–40 | 30:1 to >100:1 |
| 6 | Y1 | <20–47 | 47–93 | 25 to 40 | 50:1 to >100:1 |
| 7 | Y2 | <20–48 | 48–95 | 25 to 38 | 50:1 to >100:1 |
| 8 | Z1 | <20–44 | 44–96 | 24 to 36 | 50:1 to >100:1 |
| 9 | Z2 | <20–42 | 42–96 | 24 to 38 | 50:1 to >100:1 |
| 10 | Y3 | <20–45 | 45–97 | 24 to 40 | 50:1 to >100:1 |
| 11 | N1 | <20–44 | 44–95 | 23 to 38 | 50:1 to >100:1 |
| 12 | N2 | <20–42 | 42–93 | 22 to 38 | 50:1 to >100:1 |
| 13 | N3 | <20–45 | 45–96 | 25 to 39 | 50:1 to >100:1 |
| 14 | N4 | <20–46 | 46–96 | 25 to 38 | 50:1 to >100:1 |
| 15 | N5 | <20–45 | 45–94 | 25 to 39 | 50:1 to >100:1 |
| 16 | N6 | <20–43 | 43–96 | 23 to 38 | 50:1 to >100:1 |
| 17 | N7 | <20–43 | 43–90 | 24 to 38 | 50:1 to >100:1 |

What I claim is:

1. A liquid crystal composition which, comprises a high order, tilted ferroelectric achiral Smectic I Phase exhibiting a relaxed cone angle of greater than 20° in the absence of surface tilt alignment layers, at temperatures in the range of 5° C. to 40° C., said composition comprising from 90% to 99.9% by weight of a mixture of at least two achiral host compounds each of the formula 1:

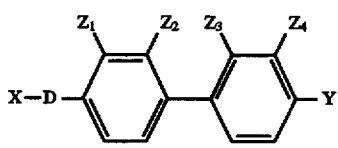

FORMULA 1 wherein

X is $A_1$ or $OA_1$;

Y is $A_1$, $OA_1$, $OCOA_1$ or $CO_2A_1$;

$A_1$ is a straight or branched chain alkyl group containing from 1 to 18 carbon atoms, optionally substituted with one or more F or CN;

$Z_1$, $Z_2$, $Z_3$, and $Z_4$ may each be H or F, but either one or two of $Z_1$, $Z_2$, $Z_3$, and $Z_4$ must be F;

D is

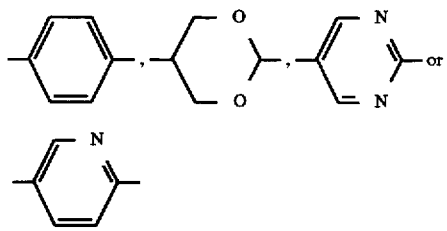

and from 0.1% to 10% by weight of a chiral dopant compound of the formula 2:

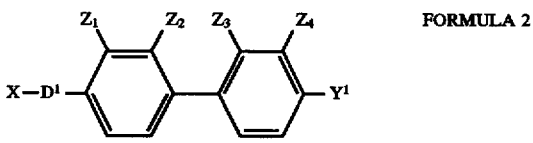

FORMULA 2 wherein $D^1$ is D (as in Formula 1) or a single bond;

$Y^1$ is $OA_3$, $OCOA_3$ or $CO_2A_4$;

$A_3$ is an alkyl group containing from 1 to 18 carbon atoms, optionally substituted with one or more F or CN and containing at least one centre of asymmetry;

$A_4$ can either be the same as $A_3$ or a group of the formula —$CH(R_1)COA_5$ wherein $R_1$ is an alkyl group containing from 1 to 5 carbon atoms and $A_5$ is $OR_1$ or —$N(R_2)R_3$ where $R_2$ and $R_3$ are hydrogen, $R_1$, phenyl optionally substituted by $R_1$, or together form a homocyclic or heterocyclic ring optionally substituted by $R_1$, provided that $R_2$ and $R_3$ are not the same;

and D, X, $Z_1$, $Z_2$, $Z_3$ and $Z_4$ have the above significance, except that all of $Z_1$, $Z_2$, $Z_3$ and $Z_4$ can be hydrogen.

2. A composition according to claim 1 wherein the achiral host compounds of formula 1 comprise those in which $A_1$ is a straight chain alkyl containing from 3 to 12 carbon atoms;

D is

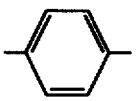

either $Z_1$ is F and $Z_2$, $Z_3$, $Z_4$, are H or $Z_1$, $Z_2$, are H and $Z_3$, $Z_4$ are F;

Y is $A_1$ or $OA_1$.

3. A composition according to claim 1 wherein the chiral dopant compounds of formula 2 comprise those in which:

$D^1$ is

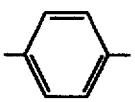

or a single bond $A_1$ is a straight chain alkyl containing from 3 to 12 carbon atoms;

either $Z_1$ is F and $Z_2$, $Z_3$, $Z_4$ are H or $Z_1$, $Z_2$, are H and $Z_3$, $Z_4$ are F, or all of $Z_1$, $Z_2$, $Z_3$ and $Z_4$ are H;

$Y^1$ is $CO_2A_4$;

$A_4$ is a straight or branched chain alkyl group substituted by F or CN or a branched chain alkyl group possessing a centre of asymmetry or

—$CH(R_1)$—$CON(R_2)R_3$.

4. A composition according to claim 2 wherein the achiral host comprises at least one compound having the following formula:

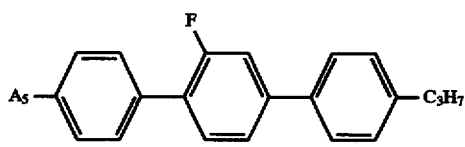

wherein $A_5$ is a straight chain alkyl group containing from 7 to 11 carbon atoms.

5. A composition according to claim 2 wherein the achiral host composition comprises at least one compound having the following formula:

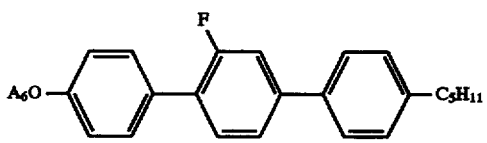

wherein $A_6$ is a straight chain alkyl group containing from 4 to 10 carbon atoms.

6. A composition according to claim 2 wherein the achiral host composition comprises at least one compound having the following formula:

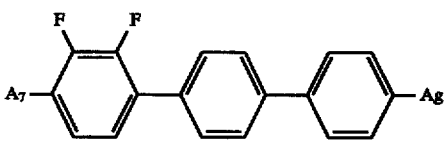

wherein $A_7$ and $A_8$ may each be straight chain alkyl groups containing from 5 to 7 carbon atoms.

7. A composition according to claim 3 wherein the chiral dopant comprises a compound of the formula X1:

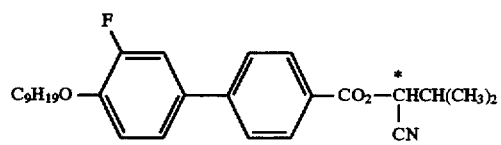

8. A composition according to claim 3 wherein the chiral dopant comprises a compound of the formula Y1:

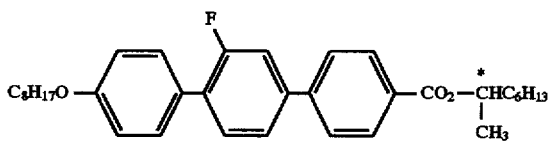

9. A composition according to claim 1 wherein the chiral dopant comprises a compound of the formula Z1:

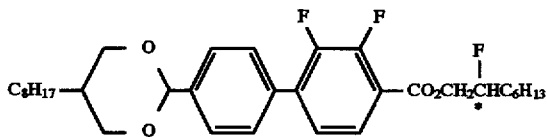

10. A composition according to claim 1 wherein the chiral dopant comprises a compound of the formula Z2:

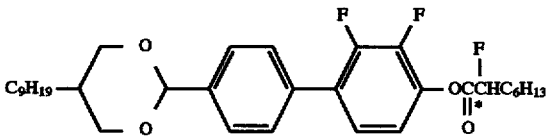

11. A composition according to claim 3 wherein the chiral dopant comprises a compound of the formula N5

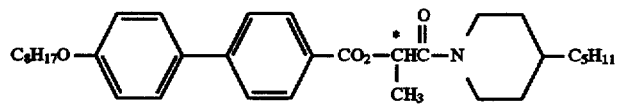

12. A composition according to claim 1 comprising a mixture of at least four achiral host compounds of formula 1 such that said mixture remains in the liquid crystalline state between −25° C. and 100° C.

13. An eutectic ferro-electric liquid crystal composition according to claim 1 having a relaxed cone angle of greater than 28° over a temperature range of from 5° C. to 40° C.

14. An eutectic ferro-electric liquid crystal composition according to claim 1 having a contrast ratio of at least 10:1 over the temperature range −25° C. to 60° C. and of at least 50:1 over the temperature range 5° C. to 40° C.

* * * * *